(12) United States Patent
Kamada et al.

(10) Patent No.: US 6,270,830 B1
(45) Date of Patent: Aug. 7, 2001

(54) STABILIZER FOR MEAT PRODUCTS AND MEAT PRODUCT COMPOSITION

(75) Inventors: Etsuo Kamada; Nobuyoshi Mochihara, both of Nobeoka (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/284,797

(22) PCT Filed: Oct. 17, 1997

(86) PCT No.: PCT/JP97/03767

§ 371 Date: Apr. 21, 1999

§ 102(e) Date: Apr. 21, 1999

(87) PCT Pub. No.: WO98/17126

PCT Pub. Date: Apr. 30, 1998

(30) Foreign Application Priority Data

Oct. 21, 1996 (JP) .................................................. 8-277919

(51) Int. Cl.⁷ ..................... A23L 1/0532; A23L 1/0534; A23L 1/317
(52) U.S. Cl. ............................. 426/646; 426/92; 426/573
(58) Field of Search ..................................... 426/573, 646, 426/92

(56) References Cited

U.S. PATENT DOCUMENTS 5,192,569 * 3/1993 McGinley et al. ................... 426/96
5,789,004 * 8/1998 Hogan et al. ........................ 426/573
6,025,007 * 2/2000 Krawczyk ............................ 426/573

FOREIGN PATENT DOCUMENTS

| 57-14771 | 8/1982 | (JP) . |
| 63-209567 | 8/1988 | (JP) . |
| 4-40849 | 2/1992 | (JP) . |
| 5260927 | 10/1993 | (JP) . |
| 6125711 | 5/1994 | (JP) . |
| 6343423 | 12/1994 | (JP) . |
| 8-51956 | 2/1996 | (JP) . |

* cited by examiner

Primary Examiner—Helen Pratt
(74) Attorney, Agent, or Firm—Birch, Stewart, Kolasch & Birch, LLP

(57) ABSTRACT

A stabilizer for foods or a stabilizer for meat products, which is effective in preventing syneresis and improving water holding capacities, yield, texture, cloudiness and the like in foods, particularly meat products using livestock meat, fish and the like. The stabilizer is characterized in that it contains a composite which has 10 to 90% by weight of a fine cellulose and 10 to 90% by weight of a gelling agent, and that it provides, when dispersed in water, an average fine cellulose particle size of not more than 20 $\mu$m and a fraction of particles having a size of not less than 10 $\mu$m of not more than 70%. The incorporation of the stabilizer can provide a meat product composition which can prevent syneresis and is improved in water holding capacities, yield, texture and other properties.

14 Claims, No Drawings

STABILIZER FOR MEAT PRODUCTS AND MEAT PRODUCT COMPOSITION

TECHNICAL FIELD

This invention relates to a stabilizer for meat products which is added to foods, in particular, livestock meats and fish in order to prevent syneresis, improve water holding capacities, improve bonding properties, impart viscoelasticity, increase suspension stability, improve cloudiness, increase in quantity, etc. This invention also relates to a meat product composition containing the stabilizer.

BACKGROUND ART

It has been a practice to incorporate natural gums such as carrageenan and curdlan, to livestock and fish meat products in order to prevent syneresis, improve water holding capacities, improve bonding properties, impart viscoelasticity, increase in quantity, etc., as is shown in JP-A-5-260927 and JP-A-4-40849 (the term "JP-A" as used herein means an "unexamined published Japanese patent application"). However, when the natural gums are used in an attempt to induce these effects, they may bring about an undesirable heavy texture due to their high viscosity.

Also, cellulose and fine cellulose are occasionally added to meat products to improve the texture, increase yield, improve cloudiness, etc., as described in JP-A-6-343423 and JP-A-8-51956. When employed alone, however, cellulose or fine cellulose cannot sufficiently achieve the effects of inhibiting syneresis and improving water holding capacities.

JP-B-57-14771 discloses food stabilizers comprising a composite of microcrystalline cellulose, carrageenan and maltodextrin (the term "JP-B" as used herein means an "examined Japanese patent application"). In general, carrageenan is classified into three types differing in characteristics depending on the algae source. Namely, λ-carrageenan is highly soluble in water and does not relate and κ-carrageenan and ι-carrageenan are soluble in hot water and relate. Although the carrageenan employed in the patent cited above is merely described as carrageenan, it is described therein that the gums either have a large swelling power or are quickly dissolved in water. It is therefore assumed that λ-carrageenan was employed in the above case.

An object of the present invention is to provide a stabilizer for meat products which is effective in preventing syneresis, improving water holding capacities, increasing yield, improving texture, improving cloudiness, etc. of foods, particularly, meat products with the use of livestock meats and fish. Another object of the present invention is to provide meat product compositions which can prevent syneresis, improve water holding capacities, yield, texture, cloudiness, etc. by incorporation of the stabilizer for meat products.

DISCLOSURE OF THE INVENTION

The present inventors have discovered that a composite comprising a specific fine cellulose and a gelling agent can achieve very excellent synergistic effects for preventing syneresis, improving water holding capacities, increasing yield, improving texture, improving cloudiness, etc. in foods, as compared with the case where either a fine cellulose or a gelling agent is employed alone. Particularly remarkable synergistic effects can be observed when the composite is employed as a stabilizer for meat products. The effects of the present invention can be most remarkably achieved on livestock meat products, among meat products.

Accordingly, the present invention is as follows.

1) A stabilizer for food, which is a composite comprising 10 to 90% by weight of a fine cellulose and 10 to 90% by weight of a gelling agent, wherein said stabilizer provides, when dispersed in water, an average fine cellulose particle size of not more than 20 μm with a fraction of particles having a size of not less than 10 μm of not more than 70%.

2) The stabilizer for food according to the above 1), wherein the gelling agent is κ-carrageenan and/or ι-carrageenan and/or semi refined carrageenan.

3) A stabilizer for meat products, which is a composite comprising 10 to 90% by weight of a fine cellulose and 10 to 90% by weight of a gelling agent, wherein said stabilizer provides, when dispersed in water, an average fine cellulose particle size of not more than 20 μm with a fraction of particles having a size of not less than 10 μm of not more than 70%.

4) The stabilizer for meat products according to the above 3, wherein the gelling agent is κ-carrageenan and/or ι-carrageenan and/or semi refined carrageenan.

5) A meat product composition containing the stabilizer for meat products according to the above 3) or 4).

The present invention is described in detail below.

The term "meat product composition", as used herein, includes livestock meat products such as ham, sausage, salami sausage, roasted meat, corned beef, canned meat, jerky, hamburger steak, fried cake of minced meat, meat ball, chaotzu, shaomai, yamato-ni (beef boiled in sweetened soy sauce), etc., which are made from beef, pork, mutton, chicken, etc., and fish meat products such as fish-paste products (chikuwa, kamaboko, etc.), putty, sausage, tuna, nikogori (jellied fish broth), etc. Also, foods and pet feeds made using these livestock meat and fish products fall within the meaning.

The term "fine cellulose" as used herein means cellulose showing an average particle size of not more than 20 μm or below, when the composite is dispersed in water by appropriate stirring. In the particle size distribution of the dispersed fine cellulose, the fraction of particles having a size of not less than loaum is not more than 70%. When the average particle size exceeds 20μm or the fraction of 10 μm or more exceeds 70%, the clouding effect is decreased and the product gives a coarse feel in the mouth. It is preferable that the average particle size is not more than 12μm and the fraction of 10 μm or more is not more than 60%. It is still preferable that the average particle size is not more than 8μm and the fraction of 10 μm or more is not more than 40%. When the coarse feel is taken into consideration, it is particularly preferable that the average particle size is not more than 4μm and the fraction of 10μm or more is not more than 10%. Although the coarse feel is lessened with a decrease in the average particle size, the lower limit of the average particle size is spontaneously determined depending on the grinding and powdering techniques and devices. Currently, the lower limit of the average particle size is considered to be about 0.05μm. With respect to the lower limit of the average particle size, it is feared that an extremely small average particle size may cause insufficient cloudiness. It is, therefore, preferable that the average particle size is not less than 0.5μm, and preferably not less than 1.5 μm.

As the gelling agent, use may be made of natural gums which are soluble in hot water, etc. and can gel either alone or in combination. Particular examples thereof include κ-carrageenan, ι-carrageenan, semi refined carrageenan, agar, furcellaran, glucomannan, gellan gum, gelatin, curdlan, pectin, soybean protein, alginic acid and its salts, xanthan gum/locust bean gum, and *Azodobacter vinelandii* gum. Either one of these natural gums or a combination of two or more may be used. The degree of gelling may be regulated by adding salts such as calcium salts. Among these gums, preferable examples includes κ-carrageenan, ι-carrageenan, semi refined carrageenan, agar, furcellaran, glucomannan, gellan gum, gelatin and curdlan, still preferably κ-carrageenan, ι-carrageenan and semi refined carrageenan. κ-Carrageenan and ι-carrageenan are carrageenans capable of gelling in water or milk, and they can be obtained by extracting red algae with an alkali, purifying the extract and then recovering by gel filtration or alcohol-precipitation followed by drying and grinding.

Semi refined carrageenan is obtained without extraction by immersing red algae in an alkali followed by washing, drying and grinding. It is cited under the name of PROCESSED EUCHEUMA SEAWEED in Compendium of food additive specifications. Addendum 3(1995). It is one of gelling agents capable of gelling in water, milk, etc. The semi refined carrageenan to be used in the present invention contains, as the major component, κ-carrageenan or ι-carrageenan. It contains acid-insoluble components originating in the production process thereof in a larger amount than in refined carrageenan, which is commonly called carrageenan. A gelling agent containing λ-carrageenan as the main component does not fall within the category of the semi refined carrageenan as used herein.

With respect to the composition ratio of the fine cellulose to the gelling agent, it is preferable that the fine cellulose accounts for 10 to 90% by weight while the gelling agent accounts for 10 to 90% by weight. When the content of the fine cellulose is less than 10% by weight, the effects of improving cloudiness and texture cannot be fully achieved. When the content of the fine cellulose exceeds 90% by weight, the texture of the product becomes less juicy but undesirably dry and rough. When the content of the gelling agent is less than 10% by weight, the effects of inhibiting syneresis and improving water holding capacities cannot be fully achieved. When the content of the gelling agent exceeds 90% by weight, the product becomes viscous and thus fails to give any satisfactory texture. It is preferable that the fine cellulose accounts for 20 to 75% by weight while the gelling agent accounts for 25 to 80% by weight. It is still preferable that the fine cellulose accounts for 20 to 60% by weight while the gelling agent accounts for 40 to 80% by weight.

In addition to the fine cellulose and the gelling agent, the stabilizers of the present invention may arbitrarily contain components usable in foods, for example, monosaccharides, oligosaccharides, sugar alcohols, starches, soluble starches, hydrolyzed starches, fats, proteins, salts such as sodium chloride and various phosphates, emulsifiers, thickening stabilizers, sour agents, flavors and food colors. To control gel properties, it is particularly effective to use salts such as potassium salts and calcium salts.

To improve the cloudiness, it is effective to add, if needed, water-insoluble calcium materials such as inorganic calcium salts such as calcium carbonate and calcium phosphate, and natural calcium materials such as calcined bone calcium and egg shell calcium, titanium oxide, etc. These components may be added at the step of the composite formation. Alternatively, they may be added after the formation of the composite.

When the coarse feel, cloudiness, etc. of meat products are taken into consideration, it is preferable that the water-insoluble calcium material or titanium oxide, if added, has an average particle size of 30cm or below, preferably 20 $\mu$m or below and more preferably 10 $\mu$m or below, when measured alone.

When the water-insoluble calcium material or titanium oxide is used, the average particle size of the fine cellulose and the water-insoluble calcium material or titanium oxide are each detected by dispersing the composite and measuring the average particle size. The average particle size thereof may be 20 $\mu$m or below and the fraction of 10 $\mu$m or more may not be more than 70%. It is preferable that the average particle size is 12 $\mu$m or below and the fraction of 10 $\mu$m or more is not more than 60%. It is more preferable that the average particle size is 8 $\mu$m or below and the fraction of 10 $\mu$m or more is not more than 40%. When the coarse feel is taken into consideration, it is particularly preferable that the average particle size is 4 $\mu$m or below and the fraction of 10 $\mu$m or more is not more than 10%. When the cloudiness are taken into consideration, the lower limit of the average particle size is preferably 0.5 $\mu$m or more, still preferably 1.5 $\mu$m or more.

To improve the cloudiness, it is preferable that the water-insoluble calcium material or titanium oxide is added in an amount of from about 1 to 30 parts by weight per 100 parts by weight of the sum of the fine cellulose and the gelling agent. When the content of such an additive exceeds 30 parts by weight, the obtained product gives a coarse feel or a bitter taste. When the content thereof is less than 1 part by weight, the cloudiness scarcely changes. It is particularly preferable to use such an additive in an amount of from 3 to 20 parts by weight.

The composite of the fine cellulose with the gelling agent according to the present invention can be obtained not merely by mixing the fine cellulose with the gelling agent each in the form of a powder, but by mixing the fine cellulose with the gelling agent in a water-containing state (i.e., slurry, paste, gel, or cake) and then drying. By mixing in the water-containing state, the surface of the fine cellulose particles becomes more compatible with the gelling agent. Before drying, the mixture preferably contains about 30% by weight or more, still preferably about 50% by weight or more, of moisture based on the weight of the whole mixture.

Examples of the composite are described in detail below. A cellulose-based material (for example, wood pulp, refined linters, regenerated cellulose, or cereal- or fruit-derived vegetable fibers) is depolymerized by acid-hydrolysis, alkali-hydrolysis, enzymatic hydrolysis, steam explosion degradation, etc. or a combination of these procedures to give an average degree of polymerization of about 30 to 375. Next, the depolymerized matter is ground by applying a mechanical shear. After adding a gelling agent, the resultant mixture is dried to thereby give the desired composite. Alternatively, it is also possible that a gelling agent is added to the depolymerized cellulose, and then a mechanical shear is applied to the mixture to thereby perform grinding and mixing at the same time, followed by drying. Moreover, the composite may be one which is obtained by optionally subjecting a cellulose-based material to a slight chemical processing, then applying a mechanical shear to effect wet-grinding or powdering, mixing the thus formed microfibrillated cellulose or powdered cellulose with a gelling agent in the presence of water, optionally grinding and then drying.

A wet grinding machine may be arbitrarily selected depending on the moisture contained in the system and the extent of the fineness of cellulose. When a mechanical shear sufficient for giving a fine cellulose of 8 μm or below in average particle size is to be applied, a medium-agitating mill may be used. Examples of mmedium agitating mills include a wet vibration mill, a wet planetary vibration mill, a wet ball mill, a wet roll mill, a wet coball mill, a wet bead mill, a wet paint shaker, a high-pressure homogenizer, etc. As a high-pressure homogenizer, it is appropriate to use one where a slurry is fed into a microorifice under a high pressure of about 500 kg/cm$^2$ or more, followed by counter collision at a high speed. Although the optimum grinding concentration varies from mill to mill, it is appropriate to achieve a solid concentration of about 3 to 15% by weight by using these mills.

When a mechanical shear giving fine cellulose of 5 to 20 μm in average particle size is applied in a slurry-like system of a solid concentration of 3 to 25% by weight, use may be made of a grinder such as a colloid mill, a continuous ball mill or a homogenizer. To grind a cake having a higher solid concentration (i.e., about 20 to 60% by weight), use may be made of a kneader, a mixing-grinding machine, an extruder, etc. A fine cellulose can be obtained by passing a cellulose-based material suspension through a high-pressure homogenizer of 50 kg/cm$^2$ or more several times to thereby loosen the fibers to give a fiber size of about 0.01 to 1 μm. Alternatively, it can be obtained by treating the cellulose-based material suspension with a medium agitating mill, etc. several times.

To achieve the objects of the present invention, one of these devices may be used alone. Alternatively, it is possible to use a combination of two or more thereof. Appropriate device(s) may be selected depending on the viscosity to be achieved for various purposes.

The mixture of the fine cellulose with the gelling agent should be dried by the most suitable method selected depending on the moisture content of the subject to be dried and the conditions thereof. When a slurry is to be dried, for example, use may be made of spray drying, drum drying, alcohol-precipitation, etc. On the other hand, a pasty or sticky mixture may be dried by compartment tray drying, belt drying, fluidized bed drying, vacuum freeze-drying, etc. Drying can be efficiently carried out by extruding the mixture before drying. Even in the case of a slurry, its solid content may be increased by pressing the slurry with a gel press, a screw press, etc. followed by drying. To improve the solubility and re-dispersibility of the composite in water, it is preferable to freeze-dry a slurry. From the viewpoint of reducing the drying cost, it is preferable to use alcohol-precipitation, pressing or compartment tray drying whereby the mixture can be dried in a state with a high moisture content. When the handling properties and stability with the passage of time are taken into consideration, it is preferable that the dried matter contains 15% by weight or less, still preferably 10% by weight or less, of water.

The dried matter obtained by drum drying, compartment tray drying, belt drying, etc. is in the form of flakes or a mass. Thus, it is preferable to grind the dried matter with the use of an impact type pulverizer, a jet mill, etc. to give a powder capable of almost completely passing through a 40-mesh sieve.

The meat product composition according to the present invention contains the meat product stabilizer comprising a composite of a specific fine cellulose with a gelling agent and, therefore, has highly favorable characteristics, i.e., inhibited syneresis, improved water holding capacities, increased yield, improved texture, improved cloudiness, etc.

The content of the stabilizer in the meat product composition of the present invention may vary depending on the meat product type. In general, it ranges from 0.01 to 10 parts by weight based on the whole meat product weight. More particularly speaking, the content of the stabilizer preferably ranges from about 0.1 to 10 parts by weight in the case of hamburger steak, from about 0.01 to 3 parts by weight in the case of ham, and from abut 0.05 to 5 parts by weight in the case of fish meat paste.

The meat product compositions may be produced in a conventional manner. To produce hamburger steak, for example, minced meat, onions, eggs, sodium chloride and the stabilizer for meat products according to the present invention, which has been optionally dissolved in water followed by gelling, are kneaded in a kneader, molded and grilled. Ham and roasted meats (pork, chicken, etc.) can be obtained by dispersing or dissolving sodium chloride, sugars, proteins, phosphates, food colors, preservatives, spices, the stabilizer for meat products of the present invention, etc. in water, and then pouring the thus obtained dispersion or solution into meat followed by heating or drying.

BEST MODE FOR CARRYING OUT THE INVENTION

The present invention will be described in greater detail with referring to the following Examples.

The measurement methods employed in the Examples are as follows.

<Average particle size, ratio of particles of 10 μm or more>

(1) 3.0 g (on a solid basis) of a sample is added to distilled water at 80° C. in an Ace Homogenizer (AM-T, manufactured by Nippon Seiki Co., Ltd.) to give a total amount of 300 g.

(2) The mixture obtained above is dispersed at 15,000 rpm for 5 minutes.

(3) The particle size distribution is measured with the use of a Horiba laser diffraction type particle size distribution measuring apparatus (LA-500) . The average particle size means the particle size of 50% cumulative volume. The ratio of particles of 10 μm or more is expressed in the ratio (%) in the volume distribution.

<Yield after heating>

The "yield after heating" is an indication of the water holding capacities of a composite and expressed in the ratio of the product weight to the weight of the unheated one.

Processed pork loin ham:

Yield(%)=product weight×100/(pork weight+pickle weight).

Hamburger steak:

Yield(%)=product weight×100/weight after dividing and molding.

<Evaluation of texture>

The products obtained in Examples and Comparative Examples were subjected to a test for texture in the following manner. Each meat product was prepared and then evaluated by 15 non-smoking young females (aged 18 to 20, average age: 19) by the random test method wherein each panelist independently took the samples.

The evaluation was made by the questionnaire system on the following items and the answers were collected.

1) Giving a juicy feel or not.
2) Giving a coarse feel or not.
3) Giving a stickiness or not.

The term "juicy feel" means quick spread of gravy in the mouth. The term "coarse feel" means a foreign substance feeling remaining on the tongue after taste. The term "stickiness" means a viscous and heavy texture in the mouth.

Based on the thus obtained data, the texture of each product was generally evaluated in 3 ranks.

EXAMPLE 1

A commercially available DP pulp was cut into pieces and then hydrolyzed in 7% hydrochloric acid at 105° C. for 20 minutes. The acid-insoluble residue thus obtained was taken up by filtration and washed to give a cellulose suspension having a solid content of 10%. The hydrolyzed cellulose had an average particle size of 25 μm. Next, the cellulose dispersion was ground by passing twice through a medium agitating wet grinder (APEX MILL MODEL AM-1, manufactured by Kotobuki Giken Kogyo, Co., Ltd.) with the use of zirconia beads of 1 mm in diameter as the medium at 1,800 rpm while feeding the cellulose dispersion at a rate of 0.4 1/min, thereby giving a fine cellulose paste. This fine cellulose had an average particle size of 3.1 μm and contained 2.8% of particles of 10 μm or more.

This fine cellulose was mixed with ι-carrageenan (Snow Brand Foods Co., Ltd.) in such a manner as to give a composition ratio on a solid basis of 40/60 to give a dispersion having a total solid concentration of 3.0%. Subsequently, ethanol was added to this slurry composition to form a precipitate. Then the precipitate was air-dried over day and night, dried with a hot air dryer and then pulverized with a hammer mill to give a composite A. Table 1 shows the average particle size and the ratio of particles of 10 μm or more when the composite A was re-dispersed in water.

Next, water was added to a mixture of 2 parts by weight of polyphosphate, 5 parts by weight of sodium chloride, 3 parts by weight of sucrose, 0.2 parts by weight of sodium L-ascorbate, 1 part by weight of sodium glutamate, 0.05 parts by weight of sodium nitrite, 5 parts by weight of lactoalbumin, 5 % by weight of isolated soybean protein and 1 part by weight of the composite A so as to give a total amount of 100 parts by weight. Then the resultant mixture was stirred to give a pickle. Thus, the sedimentation of the water-insoluble lactoalbumin and isolated soybean protein was considerably suppressed.

Subsequently, 80 parts by weight of the pickle was injected into 100 parts by weight or pork loin. After tumbling, the meat was smoked at 70° C. for 2 hours and then cooked at 80° C. for 2 hours to give a pork loin ham.

Table 1 shows the yield after heating. When sliced and taken, the ham showed good water holding capacities and a juicy texture. Table 1 also shows the results of the test for texture. The fine cellulose and protein in the stabilizer contained in the pickle were uniformly dispersed in the meat, thus achieving a homogeneous clouding state.

EXAMPLE 2

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, this hydrolyzed cellulose was mixed with κ-carrageenan (Snow Brand Foods Co., Ltd.) in such a manner as to give each composition ratio on a solid basis as defined in Table 1. Then the mixture was kneaded by using a kneader for 3 hours while adding water thereto under visual examination. As a result, the obtained materials contained from 50 to 70% by weight of water based on the total weight. After drying in an oven and grinding, composites B, C, D, E and F were obtained. Table 1 shows the average particle size and the ratio of particles of 10 μm or more when each composite was re-dispersed in water.

Next, 28 parts by weight of beef, 9 parts by weight of pork, 10 parts by weight of-lard and 3 parts. by weight of each of the composites B to F were processed with a chopper. Then, onions, bread crumbs, vegetable protein, seasonings, etc. were added, thereby giving a total amount of 100 parts by weight. The resultant mixture was mixed, divided and molded. After primary grilling, it was frozen. Then, it was thawed and cooked by secondary grilling at 300° C. for 15 minutes to give a hamburger steak.

Table 2 shows the yield and the evaluation results of texture. Each product gave a juicy feel and showed a favorable texture.

EXAMPLE 3

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, this hydrolyzed cellulose was mixed with gelatin (manufactured by Nitta Gelatin Co., Ltd.) in such a manner as to give a composition ratio on a solid basis of 50/50. Then the mixture was ground and kneaded by using a kneader for 30 minutes. Next, water was added to the kneaded matter to thereby give a slurry having a concentration of 6%. After spray drying the slurry, a composite G was obtained. When re-dispersed in water, the thus obtained composite G showed an average particle size of 15.5 μm and the ratio of particles of 10 μm was 62%.

58 parts by weight of an Alaska Pollack meat paste was roughly ground. After adding 2 parts by weight of sodium chloride and 2 parts by weight of the composite G, the resultant mixture was agitated. Then, 5 parts by weight of potato starch, 5 parts by weight of egg albumen, 1 part by weight of sucrose, 1 part by weight of mirin (sweetened sake seasoning), 0.5 parts by weight of seasonings and 25.5 parts by weight of ice/water were added thereto and the obtained mixture was subjected to the main agitation, molding and then gelatinization at a low temperature. Next, it was steamed and cooled to thereby give a kamaboko product.

Compared with the product of Comparative Example 3 (given below) containing no composite, the product of the present Example showed an improved whiteness and an elastic and favorable texture.

EXAMPLE 4

The procedure of Example 2 was repeated but using semi refined κ-carrageenan (manufactured by Nippon Carrageenan Kogyo Co., Ltd.) as a substitute for κ-carrageenan and blending fine cellulose with the semi refined κ-carrageenan so as to give each composition ratio on a solid basis as specified in Table 3, thereby giving composites K, L, M, N and O. Table 3 shows the average particle size and the ratio of particles of 10 μm or more when each composite was re-dispersed in water.

Subsequently, the composites K to O were treated in the same manner as the one employed in Example 2 to give hamburger steak products. Table 3 also shows the yields and the results of the texture evaluation. Each hamburger steak gave a juicy feel and showed a favorable texture.

EXAMPLE 5

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, this hydrolyzed cellulose was mixed with semi-refined ι-carrageenan (manufactured by Nippon Carrageenan Kogyo Co., Ltd.) in such a manner as to give a composition ratio on a solid basis of 50/50. Then the mixture was ground and kneaded by using a kneader for 30 minutes. Next, hot water was added to the kneaded matter to thereby give a slurry having a concentration of 4%. After spray drying the slurry, a composite P was obtained. When re-dispersed in water, the thus obtained composite P showed an average particle size of 13.4 μm and the ratio of particles of 10 μm was 60%.

Next, the procedure of Example 3 was repeated but using the composite P to give a kamaboko product.

Compared with the product of Comparative Example 3 (given below) containing no composite, the product of the present Example showed an improved whiteness and an elastic and favorable texture.

EXAMPLE 6

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, this hydrolyzed cellulose was mixed with the κ-carrageenan employed in Example 2 and calcium carbonate (manufactured by Shiroishi Calcium Co., Ltd., average particle size measured alone: 6.5 μm) in such a manner as to give a composition ratio of 40/50/10 and the resultant mixture was ground and kneaded with a kneader for 3 hours. Then the kneaded matter thus obtained was extruded in the form of thin noodles, dried in-an oven and powdered to give a composite T. Table 1 shows the average particle size and the ratio of particles of 10 μm or more when the composite T was re-dispersed in water.

Next, a pickle and then a pork loin ham were produced as described in Example 1 but using 1 part by weight of the composite T.

Table 1 shows the yield and the evaluation results of texture. The fine cellulose and calcium carbonate in the stabilizer contained in the pickle were uniformly dispersed in the meat, thus achieving a homogeneous clouding state.

COMPARATIVE EXAMPLE 1

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, water was added to this hydrolyzed wet cake to give a slurry having a concentration of 15%. After spray drying this slurry, microcrystalline cellulose was obtained. Table 1 shows the average particle size and the ratio of particles of 10 μm or more when this microcrystalline cellulose was re-dispersed in water.

Next, a pickle and then a pork loin ham were produced as described in Example 1 but using this microcrystalline cellulose as a substitute for the composite A.

Table 1 shows the yield and the evaluation results of texture. When sliced and taken, the ham showed a coarse feel. The microcrystalline cellulose and protein were liable to sediment in the pickle. Accordingly, the microcrystalline cellulose and protein could not be uniformly dispersed in the meat and, as a result, white spots and transparent spots were intermingled in the meat.

COMPARATIVE EXAMPLE 2

In accordance with Example 2, composites H and I each having the composition as specified in Table 2 were prepared. Table 2 shows the average particle size and the ratio of particles of 10 μm or more when each composite was re-dispersed in water.

Table 2 shows the yield and the evaluation results of texture. The hamburger steak prepared by using the composite H was sticky and showed a poor texture. The hamburger steak prepared by using the composite I achieved a low yield. When taken, it showed no juicy feel but a dry and rough texture in mouth.

COMPARATIVE EXAMPLE 3

The procedure of Example 3 was repeated but using no composite G but 60 parts by weight of an Alaska Pollack meat paste to give a kamaboko product.

COMPARATIVE EXAMPLE 4

A composite J was obtained by repeating the procedure of Example 1 but using λ-carrageenan as a substitute for the ι-carrageenan. Table 1 shows the average particle size and the ratio of particles of 10 μm or more when the composite J was re-dispersed in water.

Subsequently, a pork loin ham was produced in the same manner as the one described in Example 1.

Table 1 shows the yield after heating and the evaluation results of texture. Although the ham product showed a relatively high yield, it showed a high stickiness and unfavorable texture.

COMPARATIVE EXAMPLE 5

Similar to Example 1, a commercially available DP pulp was cut into pieces and then hydrolyzed in 7% hydrochloric acid at 105° C. for 20 minutes. The acid-insoluble residue thus obtained was taken up by filtration and washed to give a wet cake of the hydrolyzed cellulose.

Next, this hydrolyzed cellulose was mixed with semi refined κ-carrageenan in such a manner as to give a composition ratio on a solid basis of 60/40 to give a slurry having a concentration of 4%. After spray drying the slurry, a composite Q was obtained. Table 3 shows the average particle size and the ratio of particles of 10 μm, when this composite Q was re-dispersed in water.

A hamburger steak was prepared in the same manner as the one described in Example 2 but using the composite Q.

Table 3 shows the results of the evaluation. This hamburger steak showed a coarse feel and an unsatisfactory texture.

COMPARATIVE EXAMPLE 6

In accordance with Example 4, composites R and S each having the composition as specified in Table 3 were prepared. Table 3 shows the results of the evaluation.

The hamburger steak prepared by using the composite R was sticky and showed a poor texture. The hamburger steak prepared by using the composite S achieved a low yield. When taken, it showed no juicy feel but a dry and rough texture and a coarse feel in the mouth.

COMPARATIVE EXAMPLE 7

A pork loin ham were produced as described in Example 1 but using 0.4 parts by weight of the microcrystalline cellulose prepared in Comparative Example 1 and 0.6 parts by weight of ι-carrageenan employed in Example 1.

Table 1 shows the yield and the evaluation results of texture. When taken, the ham showed a coarse feel. The microcrystalline cellulose and protein could not be sufficiently dispersed in the meat and, as a result, white spots and transparent spots were intermingled in the meat.

COMPARATIVE EXAMPLE 8

A pork loin ham were produced as described in Example 1 but using 1 part by weight of ι-carrageenan employed in Example 1.

Table 1 shows the yield and the evaluation results of texture. When taken, the ham showed a high stickiness and an unfavorable texture. The protein could not be sufficiently dispersed in the meat and, as a result, a number of transparent spots were observed in the meat.

TABLE 1

|  | Example 1 Composite A | Example 6 Composite T | Comp. Ex.1 — | Comp. Ex. 4 Composite J | Comp. Ex. 7 Noncomposite | Comp. Ex. 8 — |
|---|---|---|---|---|---|---|
| Composition (wt. %) | | | | | | |
| fine cellulose | 40 | 40 | 100 | 40 | 40 | — |
| ι-carrageenan | 60 | — | — | — | 60 | 100 |
| κ-carrageenan | — | 50 | — | — | — | — |
| λ-carrageenan | — | — | — | 60 | — | — |
| calcium carbonate | — | 10 | — | — | — | — |
| After dispersing complex in water | | | | | | |
| average particle size ($\mu$m) | 3.3 | 6.6 | 28 | 3.0 | 28 | — |
| particles of 10 $\mu$m or more (%) | 4.0 | 24 | 78 | 2.5 | 78 | — |
| Evaluation of ham | | | | | | |
| yield (%) | 82 | 80 | 74 | 80 | 78 | 78 |
| Texture evaluation | | | | | | |
| No. of panelists feeling juicy*1 | 14 | 13 | 1 | 8 | 5 | 8 |
| No. of panelists feeling coarse*2 | 1 | 3 | 12 | 2 | 11 | 0 |
| No. of panelists feeling sticky*3 | 1 | 2 | 0 | 11 | 2 | 13 |
| No. of panelists being unaware | 0 | 0 | 2 | 0 | 1 | 0 |
| Total evaluation of texture | ⊚ | ⊚ | X | X | X | X |

*1, *2, *3: involving duplicated answers. Total evaluation of texture: ⊚: very good, o: good, X: poor.

TABLE 2

|  | Example 2 | | | | | Comp. Ex. 2 | |
|---|---|---|---|---|---|---|---|
|  | Comp. A | Comp. C | Comp. D | Comp. E | Comp. F | Comp. H | Comp. I |
| Composition (wt. %) | | | | | | | |
| fine cellulose | 15 | 25 | 40 | 60 | 85 | 5 | 95 |
| κ-carrageenan | 85 | 75 | 60 | 40 | 15 | 95 | 5 |
| After dispersing in water | | | | | | | |
| average particle size ($\mu$m) | 7.2 | 7.7 | 7.5 | 7.4 | 8.2 | 7.5 | 9.5 |
| particles of 10 $\mu$m or more (%) | 30 | 38 | 35 | 35 | 42 | 35 | 48 |
| Evaluation of ham | | | | | | | |
| yield (%) | 80 | 78 | 75 | 75 | 73 | 80 | 70 |
| Texture evaluation | | | | | | | |
| No. of panelists feeling juicy*1 | 14 | 15 | 14 | 12 | 10 | 11 | 3 |
| No. of panelists feeling coarse*2 | 0 | 0 | 1 | 1 | 3 | 0 | 11 |
| No. of panelists feeling sticky*3 | 2 | 1 | 1 | 1 | 0 | 10 | 0 |
| No. of panelists being unaware | 0 | 0 | 1 | 2 | 3 | 0 | 3 |
| Total evaluation of texture | o | ⊚ | ⊚ | ⊚ | o | x | x |

*1, *2, *3: involving duplicated answers. Total evaluation of texture: ⊚: very good, o: good, X: poor.

TABLE 3

|  | Example 4 | | | | | Comp. Ex. 5 | Comp. Ex. 6 | |
| --- | --- | --- | --- | --- | --- | --- | --- | --- |
|  | Comp. K | Comp. L | Comp. M | Comp. N | Comp. O | Comp. Q | Comp. R | Comp. S |
| Composition (wt.%) | | | | | | | | |
| fine cellulose | 15 | 25 | 40 | 60 | 85 | 60 | 5 | 95 |
| semi refined κ-carrageenan | 85 | 75 | 60 | 40 | 15 | 40 | 95 | 5 |
| After dispersing in water | | | | | | | | |
| average particle size ($\mu$m) | 8.6 | 9.4 | 9.2 | 9.8 | 10.2 | 26 | 7.8 | 11.5 |
| particles of 10 $\mu$m or more (%) | 42 | 45 | 44 | 48 | 52 | 80 | 37 | 56 |
| Evaluation of ham | 78 | 76 | 76 | 75 | 73 | 73 | 78 | 68 |
| yield (%) | | | | | | | | |
| Texture evaluation | | | | | | | | |
| No. of panelists feeling juicy*1 | 14 | 15 | 15 | 13 | 11 | 8 | 12 | 4 |
| No. of panelists feeling coarse*2 | 0 | 0 | 1 | 2 | 3 | 13 | 0 | 10 |
| No. of panelists feeling sticky*3 | 3 | 2 | 2 | 1 | 0 | 2 | 11 | 2 |
| No. of panelists being unaware | 0 | 0 | 0 | 1 | 3 | 0 | 0 | 3 |
| Total evaluation of texture | ○ | ⊙ | ⊙ | ⊙ | ○ | x | x | x |

+1, +2, +3: involving duplicated answers. Total evaluation of texture: ⊙: very good, ○: good, x: poor.

INDUSTRIAL APPLICABILITY

Since the stabilizers for meat products of the present invention are in the form of a composite containing a specific fine cellulose with a gelling agent at a specific composition ratio, meat products (livestock meat, fish meat, etc.) containing these stabilizers have remarkable characteristics, for example, inhibited syneresis, improved water holding capacities, increased yield, improved texture and improved cloudiness.

What is claimed is:

1. A stabilizer for meat products, which is a composite comprising 20 to 60% by weight of a fine cellulose and 40 to 80% by weight of a gelling agent, the gelling agent being at least one selected from the group consisting of κ-carrageenan, ι-carrageenan, and semi refined carrageenan, wherein said stabilizer provides, when dispersed in water, an average fine cellulose particle size of not more than 20 $\mu$m and a fraction of particles having a size of not less than 10 $\mu$m of not more than 70%.

2. A meat product composition containing the stabilizer for meat products according to claim 1.

3. The meat product composition according to claim 2, wherein the meat product further contains at least one selected from the group consisting of minced meat, onions, sodium chloride, sugars, proteins, phosphates, food colors, preservatives, spices and water.

4. The stabilizer for meat products according to claim 1, which further comprises at least one selected from the group consisting of monosaccharides, oligosaccharides, sugar alcohols, starches, soluble starches, hydrolyzed starches, fats, proteins, sodium chloride, phosphates, emulsifiers, thickening stabilizers, sour agents, flavors and food colors.

5. The stabilizer for meat products according to claim 1, which further comprises potassium salts or calcium salts, whereby gel properties are controlled.

6. The stabilizer for meat products according to claim 1, which further comprises an additive to improve the cloudiness, wherein the additive is titanium dioxide or a water-insoluble calcium material selected for the group consisting of calcium carbonate, calcium phosphate, calcined bone calcium, and egg shell calcium.

7. The stabilizer for meat products according to claim 6, wherein the additive has an average particle size of 30 $\mu$m or less.

8. The stabilizer for meat products according to claim 6, wherein the additive is added in an amount of from about 1 to 30 parts by weight per 100 parts by weight of the sum of the fine cellulose and the gelling agent.

9. The stabilizer for meat products according to claim 1, wherein the stabilizer is obtained by mixing the fine cellulose with the gelling agent to obtain a mixture in a water-containing state, and then drying the mixture.

10. The stabilizer for meat products according to claim 9, wherein before drying, the mixture contains 30% by weight or more of moisture.

11. The stabilizer for meat products according to claim 1, wherein the fine cellulose is obtained from a cellulose based material selected from the group consisting of wood pulp, refined linters, regenerated cellulose, cereal-derived vegetable fibers and fruit-derived vegetable fibers.

12. The stabilizer for meat products according to claim 11, wherein the cellulose-based material is depolymerized by acid-hydrolysis, alkali-hydrolysis, enzymatic hydrolysis or steam explosion hydrolysis to give an average degree of polymerization of about 30 to 375.

13. The stabilizer for meat products according to claim 11, wherein the depolymerized cellulose-based material is subjected to mechanical shear.

14. The stabilizer for meat products according to claim 11, wherein the content of the stabilizer is 0.1–10 parts by weight in hamburger steak, 0.01–3 parts by weight in ham, or 0.05 to 5 parts by weight in fish meat paste.

* * * * *